United States Patent

Rabowsky et al.

[11] Patent Number: 5,289,272
[45] Date of Patent: Feb. 22, 1994

[54] COMBINED DATA, AUDIO AND VIDEO DISTRIBUTION SYSTEM IN PASSENGER AIRCRAFT

[75] Inventors: Irving Rabowsky, Woodland Hills; Richard E. Sklar, Huntington Beach, both of Calif.

[73] Assignee: Hughes Aircraft Company, Los Angeles, Calif.

[21] Appl. No.: 836,683

[22] Filed: Feb. 18, 1992

[51] Int. Cl.$^5$ .................... H04N 7/10; H04N 7/04; H04N 1/02

[52] U.S. Cl. .......................... 348/8; 455/6.1; 455/6.3; 348/462

[58] Field of Search .............. 358/143, 86, 141, 142; 455/6.3, 6.1; 370/69.1

[56] References Cited

U.S. PATENT DOCUMENTS

| | | | |
|---|---|---|---|
| 3,936,595 | 2/1976 | Yanagimachi et al. | 358/143 |
| 4,264,924 | 4/1981 | Freeman | 358/143 |
| 4,573,072 | 2/1986 | Freeman | 358/86 |
| 4,584,603 | 4/1986 | Harrison | 455/6.3 |
| 4,647,980 | 3/1987 | Steventon et al. | 358/86 |
| 4,835,604 | 5/1989 | Kondo et al. | 358/86 |
| 4,866,515 | 9/1989 | Tagawa et al. | 455/6.3 |
| 4,890,320 | 12/1989 | Monslow et al. | 358/86 |
| 5,051,822 | 9/1991 | Rhoades | 445/6.3 |
| 5,134,464 | 7/1992 | Basile et al. | 358/143 |
| 5,136,411 | 8/1992 | Paik et al. | 358/86 |

Primary Examiner—Mark R. Powell
Assistant Examiner—John W. Miller
Attorney, Agent, or Firm—Georgann S. Grunebach; Terje Gudmestad; Wanda K. Denson-Low

[57] ABSTRACT

A passenger aircraft video distribution system distributes modulated RF carrier signals from a central signal source (10) to be used at each passenger seat (S1, S2, S3). The carriers are modulated to contain both audio and video data (12,14) and also other digital data, such as graphics, slide shows and the like. Analog video signals (14) from the video source are modulated (100) on individually discrete carriers in the range of 54 to 300 megahertz. Audio information, including audio sound channels and the video audio, are digitized (80,84) and combined with digital data in a combined serial bit stream that is multiplexed (82), and then modulated (96) on an RF carrier having a frequency sufficiently above the frequency band of the video signals so that the resulting spectrum of the modulated audio RF carrier does not interfere with the modulated video carriers. The RF carrier signals are combined (104) and distributed to individual seats. The modulated audio carrier (112) is separated from the video carriers (110) at each seat or each group of seats and then demodulated (116) and demultiplexed (120) for selection at each individual seat of a chosen audio channel.

28 Claims, 4 Drawing Sheets

COMBINED DATA, AUDIO AND VIDEO DISTRIBUTION SYSTEM IN PASSENGER AIRCRAFT

BACKGROUND OF THE INVENTION

1. Field of the Invention

The present invention relates to video and audio distribution systems and more particularly concerns improved distribution of numbers of channels of video, audio and other information.

2. Description of Related Art

Each passenger of a passenger aircraft may be provided with an individually controllable electronics box unit to enable personal selection of individual signals from among a group of different audio signals, a group of different video signals, and in some cases digital data for graphics, slide shows and the like. The audio signals and the video signals, together with their own audio, and also the data signals, are transmitted to each of the passenger seats from one or more central audio and/or video or data sources.

In the past, audio and data signals have been transmitted utilizing twisted pair wiring. Present systems are limited to about thirty channels of audio because data on twisted pair wiring is limited to relatively low frequencies. This limits data transmission rates, and, therefore, the number of audio channels. The video distribution system employs coaxial cable for distribution of video signals in the frequency range of 50 to 300 megahertz carriers.

The aircraft cabin entertainment system currently provides approximately 24 channels of audio, a public address channel, and a single channel for video audio. These audio signals are converted to digital signals and multiplexed onto a twisted wire pair at data rates up to 15 megabits per second. No video signals are placed on this wire. It is desirable that aircraft cabin entertainment systems be upgraded to include many channels of video distributed to passenger seats by coaxial cable. Each video channel may have mono or stereo audio and may transmit audio in several languages. As a result, the number of audio channels may increase sharply from the present 20 to 30 channels to 60 to 100 channels.

At present, audio signals are transmitted by means of one of two methods. The video channel audio can be transmitted together with the video just as in a conventional television channel. Alternatively, the video channel audio can be separated from the video and transmitted on an analog FM carrier employing one FM channel for each video audio and one FM channel for each music or other audio signal. The first approach requires an audio demodulator at each seat for the video audio and requires special circuitry to select the video audio as distinguished from the music and other audio. The second approach requires an FM demodulator at each seat. Further, in this second approach, utilization of as many as 100 separate RF carriers is likely to cause RF interference. Neither approach provides for addition of data services, such as graphics and slide show presentations, as passenger interests and demands may change in the future.

Thus, the methods of transmission of combinations of audio and digital signals are subject to a number of limitations, which would prevent use of economically and technically feasible circuitry for transmission of increased numbers of entertainment channels.

Furthermore, multiplexing together as many as 60 to 100 audio signals into a 60 megabit per second data stream, as could be required by prior systems, would generate a frequency spectrum of at least 300 megahertz of bandwidth, causing significant interference with the video signals. The resultant signal would require expensive amplifiers to pass the frequency spectrum extending from DC to 400 megahertz. Such a wide bandwidth imposes still further problems due to the frequency versus loss characteristics of coaxial cable. These characteristics, often known as "tilt", generate greater losses at higher frequencies than at lower frequencies, so that expensive techniques for equalization of signal amplitudes at the utilization station would be required.

Accordingly, it is an object of the present invention to provide an entertainment signal distribution system that avoids or minimizes above mentioned problems.

SUMMARY OF THE INVENTION

In carrying out principles of the present invention in accordance with a preferred embodiment thereof, analog video signals are modulated upon individual RF carriers in a relatively lower frequency range. Digitized audio signals, including digitized data, are modulated upon an RF carrier of a frequency sufficiently above any frequency of the video carriers to avoid interference between the modulated audio RF carrier and the modulated video RF carriers. In a particular example up to 40 analog video signals are modulated on individual RF carriers in the frequency range of between 54 and 300 megahertz, whereas the digitized audio data, presented in a single composite serial bit stream after multiplexing, is modulated upon a single audio carrier having a frequency of about 360 megahertz. Thus, the resulting modulated audio carrier will occupy a frequency spectrum of about between about 305 and 400 megahertz.

DESCRIPTION OF THE PREFERRED EMBODIMENT

The present application is related to a co-pending application of the inventors herein, Ser. No. 07/681,850, filed Apr. 8, 1991; for Automatic RF Leveling in Passenger Aircraft Video Distribution System, assigned to the assignee of the present application, and to an application of the inventors herein Ser. No. 07/681,838, filed Apr. 8, 1991 for Automatic RF Equalization in Passenger Aircraft Video Distribution System, also assigned to the assignee of the present application.

These prior applications describe passenger aircraft entertainment systems which respectively provide for amplitude leveling of signals received at each of a large number of passenger seats, which may be connected to signal sources by as much as several hundred feet of cable. The second of the two co-pending applications mentioned above describes a similar system having automatic equalization to compensate for signal tilt due to the greater amplitude losses at high frequency as compared to low frequency over the very long lengths of transmission cable involved. The disclosures of both these co-pending applications are incorporated by this reference as though fully set forth herein.

Figure 1:
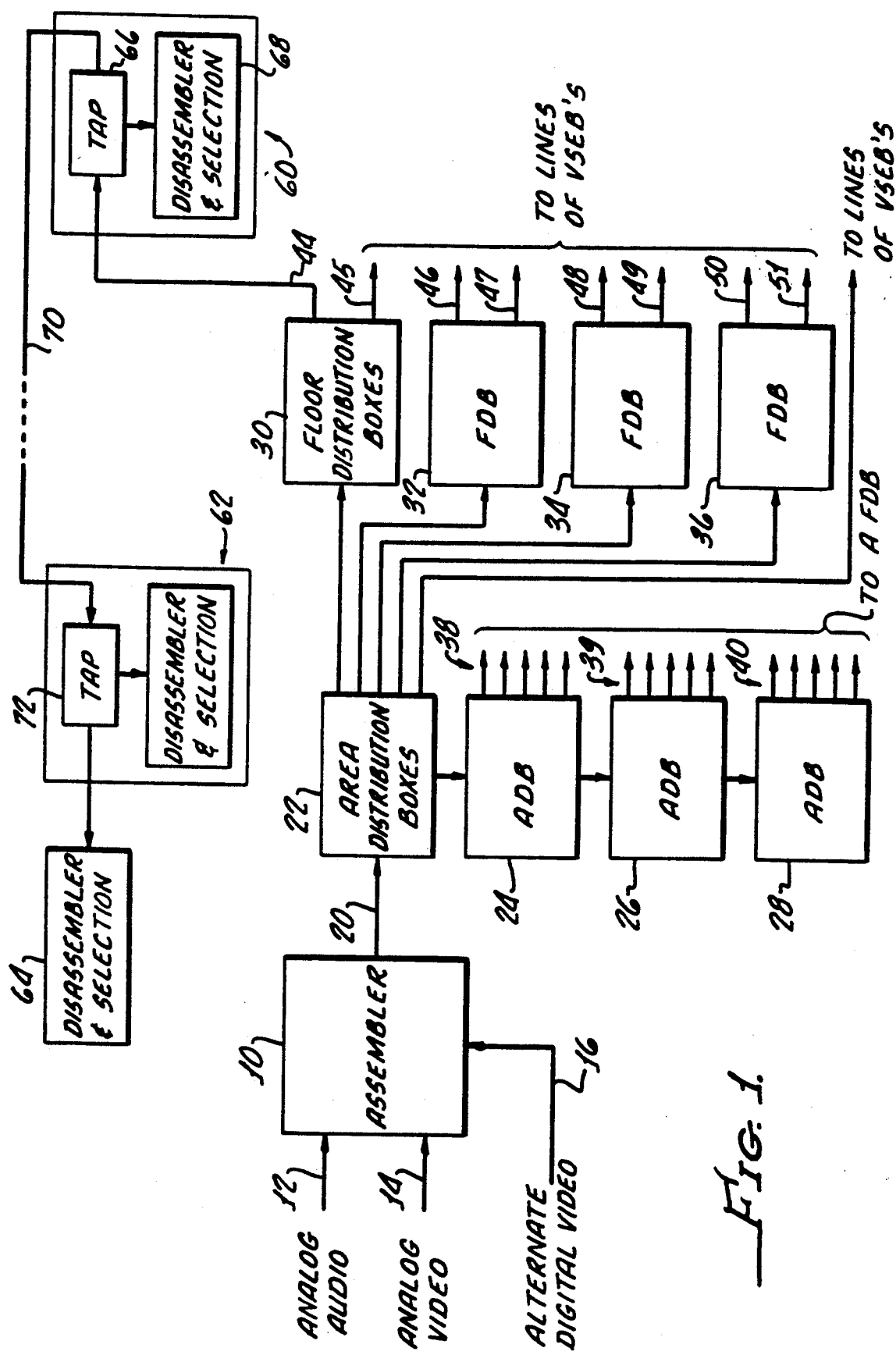
FIG. 1 is a simplified block diagram of a passenger aircraft cabin entertainment system embodying principles of the present invention.

Referring now to the simplified overall block diagram of FIG. 1, signal sources are collected together in an assembler 10, which may be termed a passenger entertainment service controller (PESC). Assembler 10 receives a plurality of analog audio inputs on a group of lines generally indicated 12 and a plurality of analog video inputs on a group of lines collectively indicated at 14. Alternatively, when available, digital video signals may be provided to the assembler 10 on a group of lines collectively indicated at 16. As previously mentioned, the number of audio and video signals may be varied in number. The system is capable of handling large numbers of signals, up to and including as many as 100 audio signals and as many as 40 channels of video signals. The audio signals may include data signals for graphic presentations or slide presentations.

As will be more particularly described below, the audio signals are digitized and multiplexed to provide a serial bit stream, and then modulated upon an audio RF carrier, having a frequency of about 340 to 360 megahertz in a particular example. The alternative digital video signals are multiplexed together with the digitized analog audio entertainment signals and modulated upon the same audio carrier. The analog video signals are modulated upon individual video carrier signals in the frequency range of between about 50 and 300 megahertz. All of the video and audio carriers are combined to provide a combined output on a line 20 of as many as 41 or more RF carriers, including, in a specific example, as many as 40 carriers in the range of 50 to 300 megahertz and a single audio carrier at 340 megahertz, for example. The combined output on line 20 is transmitted by coaxial cable, represented by line 20 in FIG. 1, to a series of area distribution boxes (ADB) indicated at 22,24,26 and 28, each of which provides a plurality of outputs to an individual one of groups of floor distribution boxes (FDB), indicated at 30,32,34 and 36 for the outputs of one area distribution box 22. Each of the area distribution boxes (ADB) 24, 26 and 28 similarly provides individual outputs to its own group of floor distribution boxes (FDB's) which are not shown in the drawing for convenience of illustration. The outputs of ADB's 24, 26, and 28 are collectively indicated at 38, 39, and 40 in FIG. 1. Each floor distribution box or FDB provides a plurality of outputs which may be two or more in any given configuration, which are indicated by lines 44, 45, 46, 47, 48, 49, 50 and 51 for the several FDB's illustrated in FIG. 1. Each output line from a floor distribution box, such as line 44, is connected to a single line of video seat electronic boxes (VSEB's) which, for the output 44 of FDB 30, is indicated as a first group of VSEB's indicated at 60, a second group, indicated at 62, and a final group indicated at 64. Each group 60, 62 and 64 represents a plurality of seats, which may be from two to five in number. Thus, if a line of seats (and VSEB's) has three groups of five VSEB's each, then the output coaxial cable (line 44) from FDB 30 will service fifteen passenger seats. Each group of VSEB's, such as VSEB 60 for example, includes a tapping circuit 66 that taps the signals on line 44 for transmission to a disassembler and selection circuit 68 in the group and additionally transmits all of the signals of line 44 via a further coaxial line section 70 to a tapping circuit, such as tapping circuit 72 of the groups of video seat electronic boxes further on down the line, such as groups 62 and 64, whereby each group of seats of a line of seats served by transmission line 44 from FDB 30 receives all of the signals from its tapping circuit, and each, excepting only the last group in the line of VSEB's, passes all of the signals down to the next group in the line.

The disassembler and selection circuit 68 separates the audio and video carriers and demodulates the audio carrier to provide the composite digitized audio bit stream, which is then demultiplexed by means of channel selection from each individual seat to provide at the individual seat the audio or video signals selected by the seat passenger.

Figure 2:
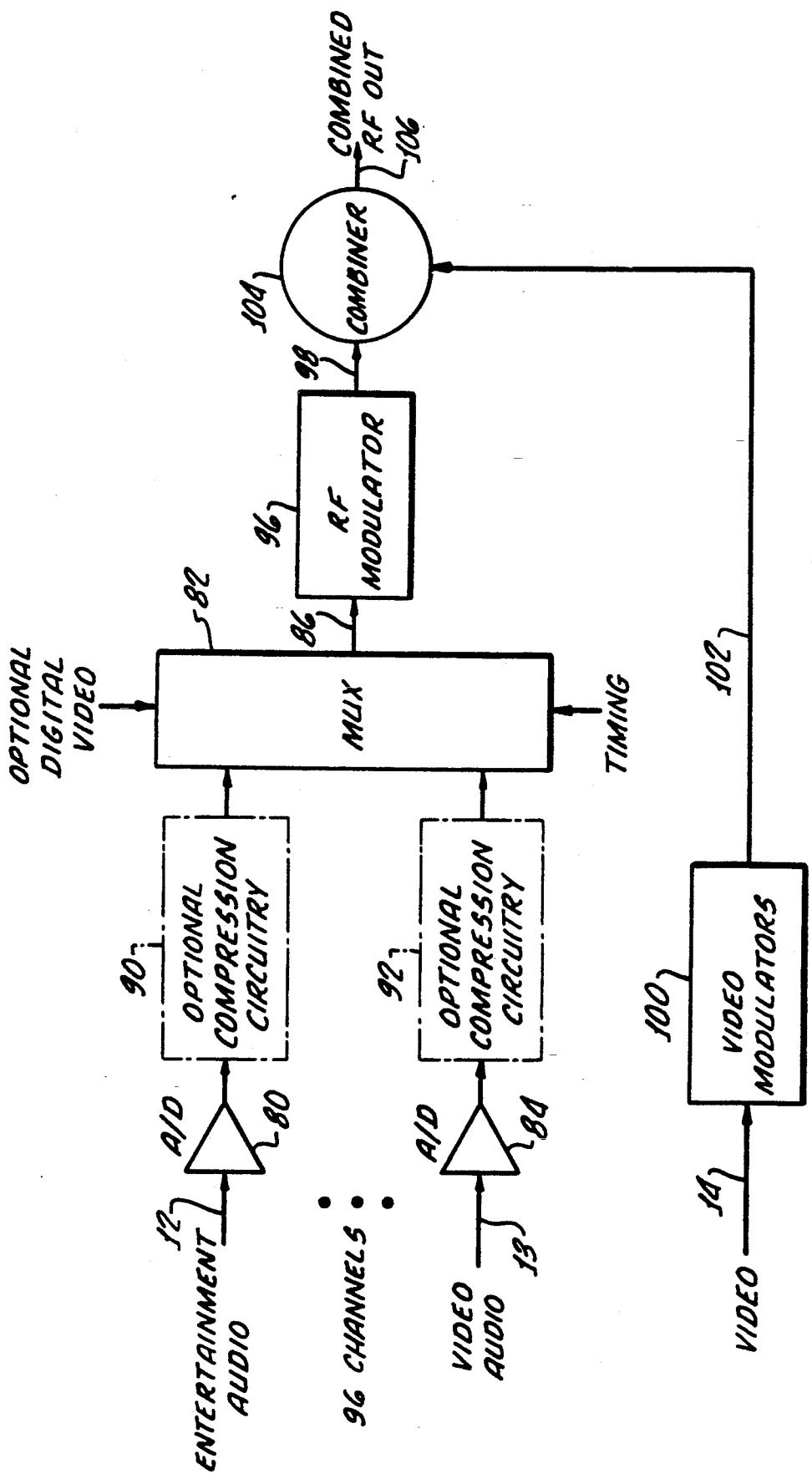
FIG. 2 is a block diagram of an assembler system which combines various audio, video and data signals from their several sources.

FIG. 2 illustrates further details of the assembler circuit, of which further details are shown and described in the above-identified co-pending patent applications. As illustrated in FIG. 2 the entertainment audio is furnished from various audio sources (not shown) located at one or more central sources in the aircraft, and fed on line 12 to analog to digital conversion circuitry 80, and thence to a multiplexer 82. Similarly, the audio signals, extracted from the video signals at the video source, are fed on a line 13 to additional analog to digital conversion circuitry 84 and to the multiplexer 82. The multiplexer provides on an output line 86 a serial bit stream comprising digital samples of each of the audio inputs, in sequence. A more detailed description of the digitization of the audio inputs may be found in a co-pending application of Kenneth A. Brady, Jr. and Richard E. Sklar for Daisy Chain Multiplexer, Ser. No. 630,713, filed Dec. 20, 1990. The disclosure of this application is incorporated by this reference as though fully set forth herein. If deemed necessary or desirable, the digitized entertainment audio and video audio signals can be compressed by suitable well known data compression techniques in compression circuitry indicated in dotted boxes 90,92, interposed between the analog to digital conversation circuitry and the multiplexer.

The serial bit stream of digitized audio on line 86 is fed to an RF modulator 96 in which the digitized audio is modulated upon a carrier preferably having a frequency in the range of about 360 megahertz. The carrier frequency should be sufficiently above the highest of the video carrier frequencies so that the spectrum of the modulated audio carrier, that is, the audio carrier modulated with the digitized audio, has a lowest frequency above the highest frequency band of the video carriers. Accordingly, where video carriers are in the range of about 54 to 300 megahertz, an audio carrier of 60 megahertz can be modulated with 60 megabytes per second of digital audio data so that the resultant frequency spectrum of the modulated audio carrier is sufficiently above the video signals to avoid unwanted interference. At the output of the RF modulator 96, on a line 98, appears the audio RF carrier modulated with digital audio and occupying a frequency band of between about 305 and 400 megahertz.

Video signals provided from a video source, not shown, on a line 14 (see also FIG. 1) are fed to video modulators 100 in the assembler to provide on an output line 102 a plurality of radio frequency video carriers in the frequency range of between 54 and 300 megahertz. The video carriers on line 102 and the audio carrier on line 98 are combined in combining circuit 104 to provide a combined output signal from the combiner on a line 106 that is transmitted along a coaxial cable for distribution to the passenger seats via the previously described area distribution boxes and floor distribution boxes (see FIG. 1). The combined radio frequency signal on line 106, after transmission through the various distribution boxes, is received at the selection and disassembling station, such as Video Seat Electronics Box (VSEB) 60 of FIG. 1, for example, which receives the incoming signals at an input filter 108. Details of the selection and disassembling station (VSEB) are shown in FIG. 3.

In filter ;08 the modulated RF video carriers are separated out as a band of low frequencies appearing on line 110, and the higher modulated RF audio carrier (in the 305 to 400 megahertz range) appears on a separate output line 112 from the filter. Each of the disassembly and selector circuits of FIG. 3 may be duplicated for each seat, or, preferably, for each group of about five seats, as will be explained in further detail in connection with the illustration of FIG. 4. The audio modulated RF signal is fed to an RF demodulator 116, of which only one need be provided for each group of seats, which provides at its output, on a line 118, a serial bit stream of digitized audio data. Where the inputs include other digital data, such as that provided for graphics and slide shows or digital video, such digital signals are combined in the serial bit stream provided from the RF demodulator on line 118. This serial bit stream is fed to a demultiplexer or channel selector 120 which receives selection signals collectively indicated by a selection input line 122 under control of the individual passengers at individual passenger seats, as will be described below. The selection provided by the demultiplexing circuit allows a selected single one of the audio data or digital video signals to be provided on the several outputs of the demultiplexing circuit.

Figure 3:
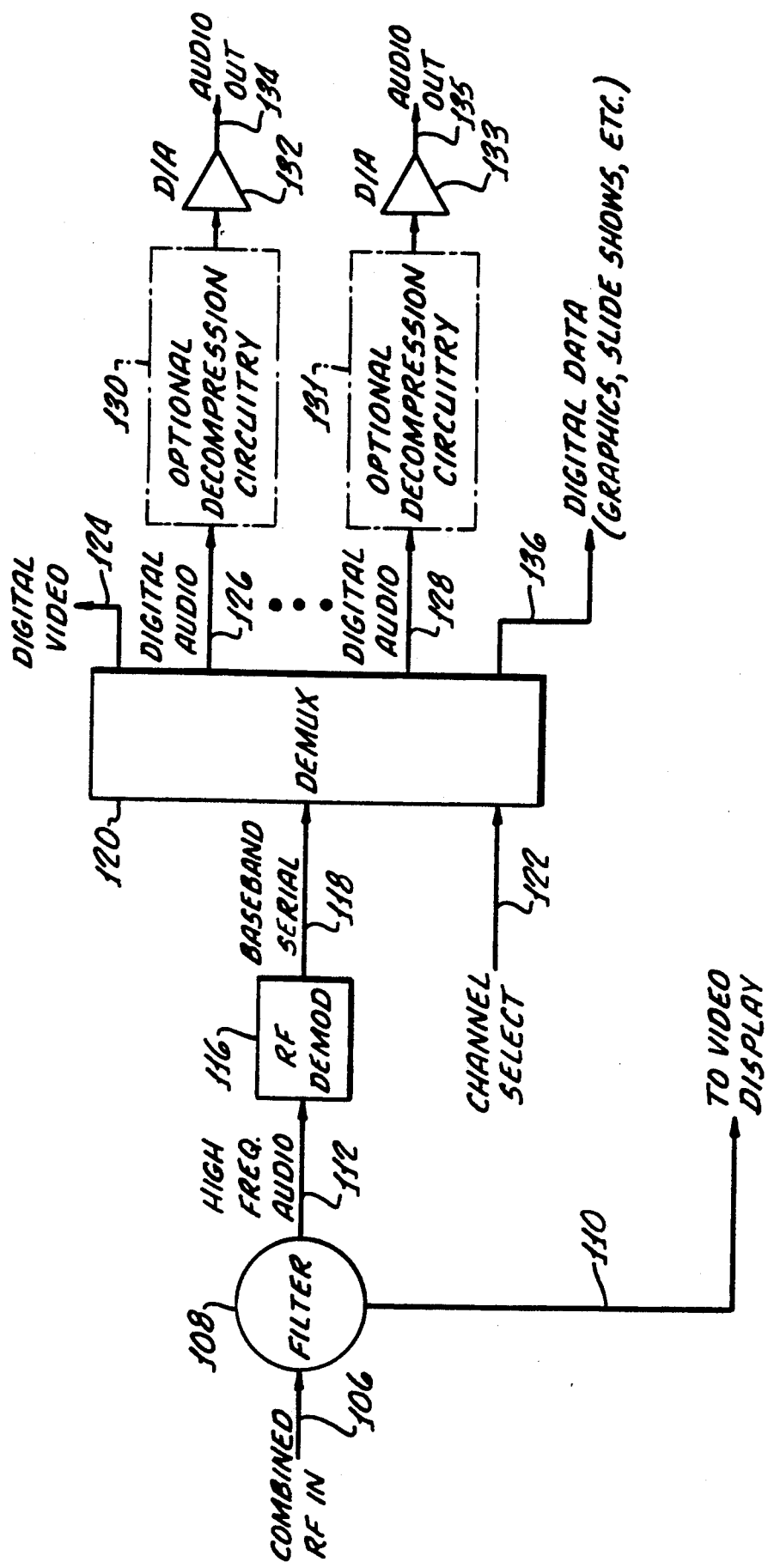
FIG. 3 is a block diagram of a selection and disassembler system that receives the combined modulated RF carriers and distributes these to individual passenger seats.

In FIG. 3 output line 124 indicates the digital video output, if there is such an input at the assembling circuit of FIG. 2. Line 126 indicates a number of digital audio signals, there being a separate line for each separate audio signal, which provide the digital audio to optional decompression circuitry, if compression circuitry has been used in the assembler, indicated at 130. The selected audio signal, after decompression, is fed to a digital to analog converter 132 to provide on an output line 134 the selected analog audio signal. Similarly, where digital data is provided at the input, a group of lines indicated at 136 provides this digital data to a graphic display, slide display or the like. To recapitulate, the digital audio data, which includes the digitized audio entertainment and the digitized audio signals of the video, are output from the demultiplexer on a group of lines indicated as including output lines 126 and 128, which send the signals to digital to analog converters 132 and 133 via optional decompression circuitry 130 and 131, if corresponding compression circuitry 90 and 92 has been used in the assembler. Thus, audio output is provided from the converters 132, 133 on a group of lines including lines indicated at 134 and 135.

Figure 4:
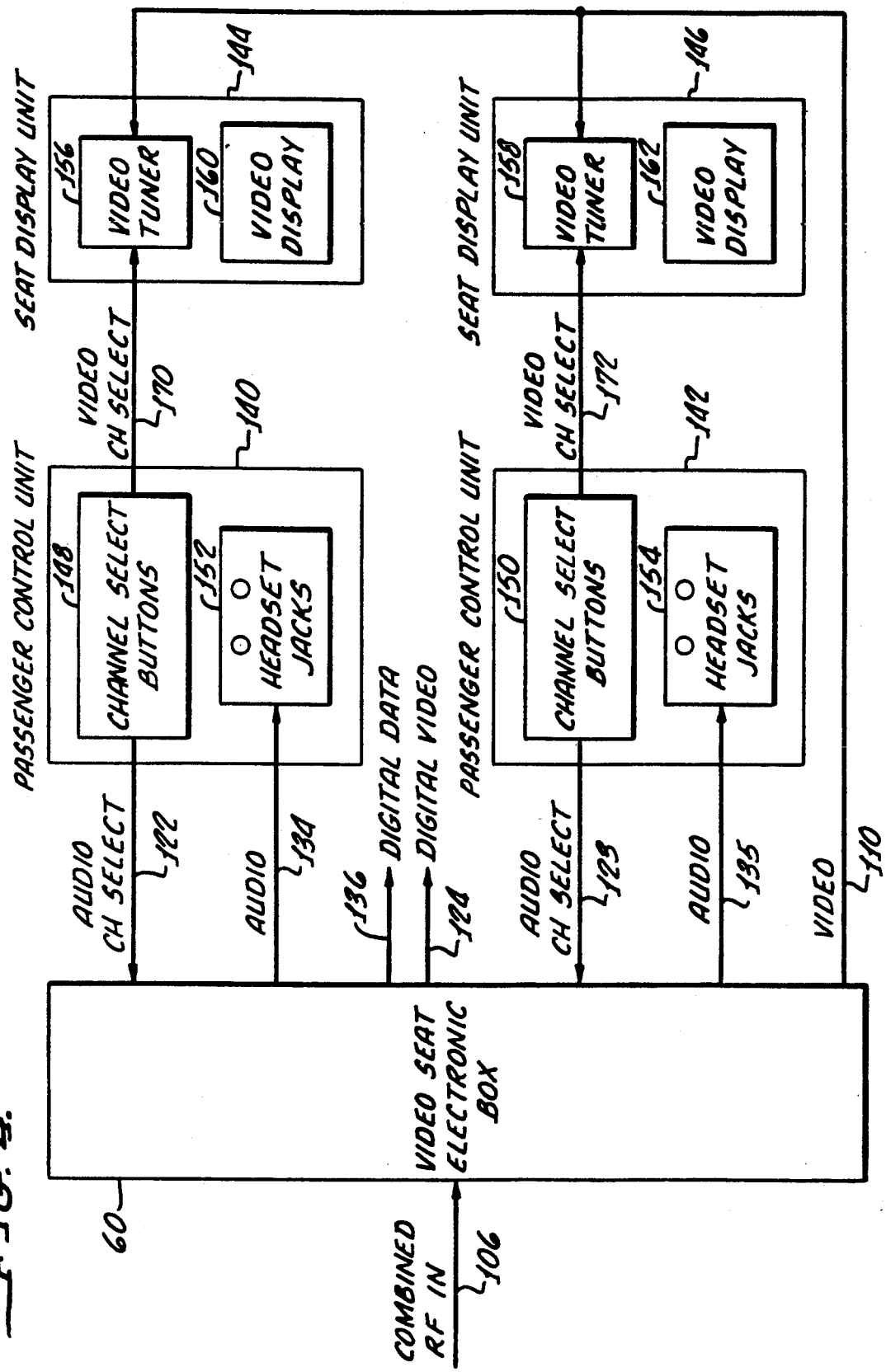
FIG. 4 illustrates further details of distribution of the several channels as selected at individual passenger seats.

Illustrated in FIG. 4 is a simplified showing of a group of two seats which are serviced by a single RF demodulator and demultiplexer. As previously mentioned, one demodulator and demultiplexer may serve a number of seats, which number may vary from one to five or more in a group of such seats. FIG. 4 shows a group of two seats serviced by a single Video Electronics Seat Box 60. Nevertheless, as previously mentioned, each VSEB may service up to five or more individual passenger seats. VSEB 60, as shown in FIG. 3, receives a combined RF input on line 106, and provides audio output on lines 134 and 135. At each seat there is a passenger control unit 140,142 and a seat display unit 144,146. Each passenger control unit includes a set of channel select buttons 148,150 and a pair of audio head set jacks 152,154 that receive audio signals on lines 134,135 from VSEB 60. Each display unit includes a video tuner 156,158 that receives video signals on line 110 from VSEB 60 and controls a video display 160,162. Channel select button sets 148,150 control selection of audio channels via line 122 from button set 148 and via a line 123 from button set 150. The channel select button sets also control the video tuners via lines 170,172.

Although the invention has been described as used in a passenger aircraft entertainment system, it is also applicable to other systems for distribution of many signals to many different users. Such other systems include passenger trains and office buildings.

There have been described methods and apparatus for transmitting large numbers of audio, data and video signals which are adaptable for expansion and transmission of still additional signals. The system has an exceedingly large capacity and yet employs less wiring because all signals, including audio, digital data and video signals, are transmitted on the same coaxial cable. Further, all audio is digitized and transmitted on a single carrier. The system minimizes required expense of components because of the use of fewer audio demodulators and the elimination of special circuitry that might otherwise be required to select between video, audio and other entertainment audio.

What is claimed is:

1. A method for transmitting a plurality of audio and video signals comprising the steps of:
   providing a plurality of digitized audio signals,
   multiplexing said signals to provide a serial bit stream of digitized audio signals,
   modulating said serial bit stream upon a radio frequency audio carrier having a frequency above a predetermined high frequency,
   providing a plurality of video carriers in a frequency range below said predetermined high frequency,
   modulating a plurality of video signals on said video carriers,
   combining said audio and video carriers to provide a combined RF output,
   transmitting said combined RF output to at least one remote station,
   separating said audio carrier from said video carriers at said remote station, and
   separately transmitting said audio carrier and said video carriers to a user station.

2. The method of claim 1 wherein said digitized audio signals include audio portions of said video signals, and wherein said video signals include no audio portions.

3. The method of claim 1 wherein said step of separately transmitting said audio and video carriers comprises demodulating said audio carrier to obtain a further serial bit stream containing said digitized audio signals and selecting one of said digitized audio signals for utilization at a user station.

4. The method of claim 3 wherein said step of separately transmitting includes the step of separately transmitting said modulated video carriers to a user display.

5. The method of claim 3 wherein said step of selecting one of said audio signals for utilization at a user station includes the step of converting said digitized audio signals to analog audio signals.

6. The method of claim 1 including the additional steps of providing a digital video signal and multiplexing said digital video signal with said digitized audio signals.

7. The method of claim 1 including the additional step of compressing said digitized audio signals.

8. The method of claim 7 including the steps, performed at said remote station, of demodulating said digitized audio signals, selecting a demodulated digitized audio signal, decompressing a selected demodulated digitized audio signal, and converting decompressed selected demodulated digitized audio signal to an analog audio signal for use at said station.

9. The method of claim 1 including the step of multiplexing at least one video audio signal together with said first mentioned audio signals.

10. The method of claim 1 wherein said video carriers are provided in a frequency range between about 50 and 300 megahertz, and wherein said audio carrier is provided in a frequency range between about 305 and 400 megahertz.

11. The method of claim 1, wherein said step of transmitting comprises transmitting said RF output via a single coaxial cable.

12. The method of claim 1 wherein all audio portions of all of said video signals are removed from said video signals, are digitized and multiplexed with said digitized audio signals so that said serial bit stream of digitized audio signals includes audio portions of said video signals and wherein said video carriers include no audio signal portions.

13. A multiple signal distribution system comprising:
audio source means for providing a plurality of audio source signals,
means for digitizing the audio source signals to provide digitized audio signals,
means for multiplexing said digitized audio signals to provide a serial bit stream,
RF modulator means for modulating said serial bit stream upon an audio carrier having a frequency above a predetermined frequency,
video source means for providing a plurality of video signals,
video modulator means for modulating said video signals upon a plurality of video carriers, each having a frequency below said predetermined frequency,
means for combining said audio and video carriers, and
means for transmitting a combination of said audio and video carriers to a remote station.

14. The system of claim 13 including at said remote station means for receiving said combination of said audio and video carriers, means at said remote station for separating said audio carrier from said video carriers, means at said remote station for demodulating said audio carrier to provide a further serial bit stream of digitized audio data, means for selecting at least one audio signal of said digitized audio data for use at said remote station, and means for selecting at least one of said video carriers for use at said remote station.

15. The system of claim 14 wherein said source means comprise part of a passenger aircraft entertainment system, and wherein said remote station includes a passenger seat.

16. The system of claim 13 including means for providing a digitized video signal and wherein said means for multiplexing comprises means for multiplexing said digitized video signal together with said digitized audio signals.

17. The system of claim 13 including means interposed between said audio signal digitizing means and said multiplexing means for compressing said digitized audio signals.

18. The system of claim 13 wherein said audio carrier has a frequency of at least 300 megahertz and wherein at least a group of said video carriers have frequencies below 300 megahertz.

19. The system of claim 18 wherein said audio carrier as modulated with digitized audio signals occupies a frequency band between 305 and 400 megahertz.

20. A passenger aircraft entertainment signal distribution system comprising:
a passenger entertainment service controller station (PESC) having audio and video inputs and including:
analog to digital converter means responsive to said audio inputs for providing digitized audio signals,
multiplexer means for multiplexing said digitized audio signals,
RF modulator means for modulating multiplexed digitized audio signals to provide an audio carrier having said digitized audio signals modulated thereon, said audio carrier having a frequency above 300 megahertz,
video modulator means for modulating said video inputs upon a plurality of video carriers, said video carriers having frequencies below 300 megahertz, and
means for combining said modulated video carriers and modulated audio carrier to provide a combined radio frequency output,
means for transmitting said combined radio frequency output to a remote station,
a plurality of video seat electronic box stations (VSEB) adjacent said remote station,
each said VSEB comprising disassembler and selection means for receiving a transmitted combined radio frequency output, said disassembler and selection means comprising:
filter means for separating said audio carrier from said video carriers,
means for demodulating said audio carrier to provide a serial bit stream of audio signals,
means for selecting an audio signal from said serial bit stream,
means for converting said selected audio signal to an analog audio signal for use at an individual passenger seat, and
means for selecting a modulated video input for use at an individual passenger seat.

21. A system for transmitting a large number of audio and video signals comprising:
means for digitizing and multiplexing said audio signals to provide a serial bit stream of digitized audio signals,
means for modulating said serial bit stream of digitized audio signals upon a radio frequency carrier having a frequency above the highest frequency of a predetermined band of frequencies, means for modulating said video signals on individual ones of a group of video carriers having frequencies within said predetermined band of video frequencies, means for combining said groups of video carriers and audio carrier, means for transmitting combined carriers, and means for separating a modulated audio carrier from modulated video carriers to provide a separated audio carrier and a plurality of separated video carriers.

22. The system of claim 21 including means for removing said separated audio carrier from said digitized audio signals, means for selecting a single one of said digitized audio signals of said separated audio carrier for utilization at an individual station, and means for transmitting said separated video carriers for use at an individual station.

23. A method of transmitting a plurality of signals comprising:

providing a group of lower radio frequency carriers within a relatively lower frequency band, providing a higher radio frequency carrier having a frequency above said relatively lower frequency band, modulating said lower radio frequency carriers utilizing a first modulation technique with a first group of signals to provide a group of lower modulated carriers, modulating said higher radio frequency carriers utilizing a second modulation technique with a second group of signals to provide a higher modulated carrier, combining said lower and higher modulated carriers to provide a combined signal, and transmitting said combined signal on a common transmission line.

24. The method of claim 23 wherein said first group of signals comprises video signals, and wherein said second group of signals comprises a serial bit stream of digitized audio signals.

25. The method of claim 23 wherein said relative lower frequency band has an upper limit of about 300 MHz, and wherein said higher modulated carrier has a frequency above 300 MHz.

26. The method of claim 22 wherein said first modulation technique is a video modulation technique.

27. The method of claim 22 wherein said second modulation technique is audio modulation technique.

28. The method of claim 22 wherein said second modulation technique is a data modulation technique.

* * * * *